Nov. 12, 1968 J. W. MARR 3,411,073
GAS DETECTOR HAVING INLET ORIFICE FOR LINEAR
OPERATION OF THE DETECTOR
Filed July 1, 1965

Inventor:
Jules William Marr,
by Paul A. Frank
His Attorney.

3,411,073
GAS DETECTOR HAVING INLET ORIFICE FOR LINEAR OPERATION OF THE DETECTOR
Jules William Marr, Ballston Lake, N.Y., assignor to General Electric Company, a corporation of New York
Filed July 1, 1965, Ser. No. 468,811
2 Claims. (Cl. 324—33)

ABSTRACT OF THE DISCLOSURE

A gas sensor for detecting either a change in composition of known gases, or a change in the pressure of a single gas. The sensor comprises an ion pump enclosed in a chamber, and an inlet orifice for admitting the gas to be monitored. The orifice is of predetermined size such that for the particular gaseous medium and ion pump characteristics the flow pressure product through the orifice maintains pump operation in its linear gas pressure versus electrical current operating range. A change in the current indicates either a change in the gas composition or a change in pressure of a single gas.

---

My invention relates to a gas detector, and more particularly, to a gas sensor which employs a vacuum pump for effectively detecting the presence of a new gas, or the increase in concentration of a gas already present, in the atmosphere under test.

With the emphasis on reliability in modern technology, there is a need for equipment that will rapidly and efficiently detect the concentration of gas within a system, and changes in concentration indicative of a leak involving that gas. Detection becomes more difficult when the gas being investigated is in the presence of a background quantity of the same gas. For example, detection of a leak of oxygen into a background of air containing 20% oxygen.

Numerous devices exist for detecting leakage of gases, such as mass spectrometry, thermal conductivity fluctuation and electron emission from a hot surface. Most of these devices require complex equipment and involved procedures and very often are not capable of coming in direct contact with the point of leakage thereby further complicating the equipment needed for gas detection. Ion pumps have overcome many of these problems but presently can only be employed for leak detection of vacuums. A gas sensor is thus needed which is cheap, compact and reliable, and capable of monitoring a gas to detect any concentration thereof, even in the background presence of the same gas. My invention envisions a gas detector employing an ionic vacuum pump which is capable of sensing a gas under any conditions of pressure, including atmospheric.

The chief object of my invention is the provision of an improved gas sensor employing a vacuum pump which is capable of measuring gas concentration under any conditions of pressure.

Another object of my invention is to provide such apparatus which is continually responsive to changes in the composition of gas passing therethrough.

Another object of my invention is to provide such apparatus wherein only a predetermined volume of gas enters the detector.

A further object of my invention is to provide such aparatus which establishes a gas level and readily indicates changes therefrom.

These and other objects of my invention will be more readily perceived from the description which follows.

One of the features of my invention is a highly effective gas detector employing an ionic vacuum pump which continually pumps the contents of a passage exposed at one end to the gas being monitored. A small orifice in the passage limits the flow of gas through the passage to that predetermined amount which will keep the ion pump operating in the linear region of its characteristics. Since the current used by the ion pump depends upon the composition of the gas in the passage, any change in the composition of the gas will cause a proportionate change in current.

The attached drawing illustrates a preferred embodiment of my invention in which.

Figure 1:
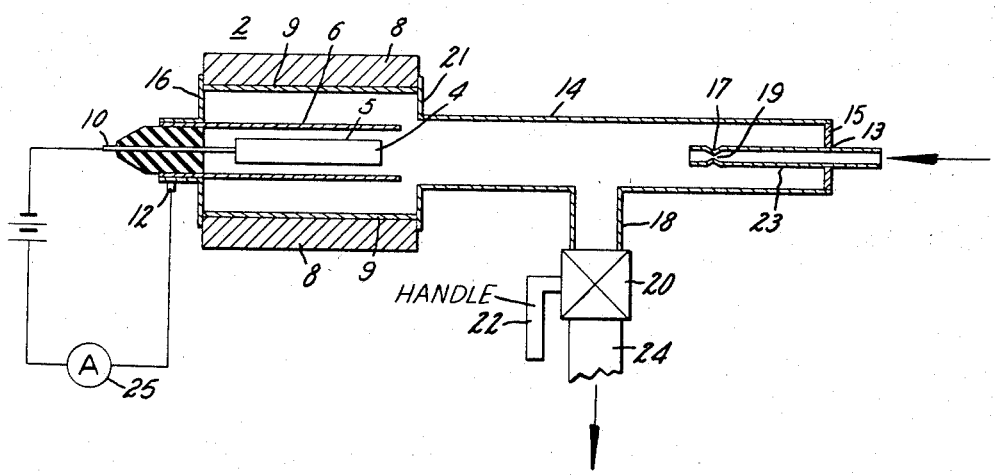
FIGURE 1 is a cross-sectonal view of the gas detector of my invention.

In FIGURE 1 there is shown a cross-sectional view of the gas sensing apparatus embodying the present invention. The construction includes vacuum pump 2 which as shown in the figure is an ion pump of the "diode" type, a two electrode pump, but may also be of the "triode" or other suitable type, as will be subsequently described. Ion pump 2 comprises two electrodes with a high electrical potential therebetween. The negative one, cathode 4, is constructed of reactive metal, such as titanium, and is surrounded by the positive one, hollow anode 6, which as illustrated may be cylindrical in shape to be in proper relation to the longitudinal surface 5 of cathode 4. Magnet 8 is hollow and surrounds electrodes 4 and 6 to provide a high magnetic field in an axial direction which, by way of example, may be 2000 gauss in magnitude. A voltage is impressed between leads 10 and 12 which are connected to cathode 4 and anode 6, respectively, to provide a potential therebetween. Electrons are emitted, because of this potential across the electrodes, from relatively cold negative cathode 4 and travel towards positive anode 6. Prior to striking anode 6, the straight line path of the electrons is altered by the presence of the axial magnetic field caused by magnet 8. The electrons thus trapped between the opposing electrostatic and magnetic fields spin between anode 6 and cathode 4 in a helical path around cathode 4 to provide a long path, in which the electrons can be struck by incoming molecules of the gas being monitored. Thus, the long helical path the electrons take, provides for a high degree of utility thereof, since each electron is in position between electrodes 4 and 6 for a greater time and collision with a gas molecule becomes that much more likely. The electrons in colliding with gas molecules impart energy to the molecules to ionize them, and thereby produce positive ions and more free electrons. Because of their positive charge, the ions are accelerated by the electrical potential between anode 6 and cathode 4, and travel toward negatively charged cathode 4. The ions then hit cathode 4, their mass being too great to be deflected by the magnetic field of magnets 8, as are the electrons, aforementioned. In hitting the cathode 4, the ions, knock loose titanium atoms, which are then deposited on anode 6. The interrelation between the loose sputtering titanium metal atoms, the ionized gas molecules and electrodes 4 and 6 causes the pumping action of the ion pump.

In accordance with the present invention tubular member or probe 14 is connected to ion pump 2 in a manner so that it is the only means of entrance into ion pump 2. In other words, member 14 is secured to pump 2 by means of wall 21, hermetically or in other appropriate manner, so that all gas that is admitted to ion pump 2 passes through tube 14. Walls 16 and 9 complete the enclosure of ion pump 2 so that the pump is completely sealed, save for the entrance through tube 14. These walls which form the sealing means are constructed of material such as steel which is strong enough to withstand a vacuum within ion pump 2, as is needed for its proper operation. An ion pump operates most effectively at pressures approaching an absolute vacuum, e.g., at least $10^{-4}$ torr (760 torr equals one atmosphere of pressure) since at higher pressures, approaching atmospheric pressure the current response to pressure is non-linear and the current required to operate the ion pump would be so high as to result in serious arcing between the electrodes, because of the high potential therebetween and possible serious impairment to the successful operation of the pump. A minimum pressure in the order of $10^{-8}$ torr defines the lower limit of the linear current versus pressure operating range for my device wherein at such low pressures the electrical currents between the cathode and insulator are a significant portion of the total ion pump current.

Projecting through wall 15, that seals the end of tube 14 opposite ion pump 2, is gas admitting means or tubular member 23, preferably having a crimp 17 or other restriction in its length, to further restrict the flow therethrough. It is noted that the connection between wall 15 and both tubes 14 and 23 is also airtight and capable of withstanding a vacuum so that the entire unit is properly sealed, as aforementioned, for its effective operation. Because of the relationship between tube 14 and tube 23, the latter is the only means for admission of gas into tube 14 and thereby into ion pump 2. T extension pipe 18 which projects from tube 14 in a direction approximately perpendicular thereto, extends into valve 20, which is regulated by a suitable control, such as handle 22, to provide a quick and effective means of connecting a suitable pump to the system for evacuating it to produce the desired vacuum conditions within ion pump 2. The vacuum pump (not shown) is connected to pipe 24, valve 20 is opened by means of handle 22 and the system is evacuated, to produce a very low pressure, in the vicinity of $10^{-4}$ torr, therein. This initial low pressure may be measured by any suitable pressure gauge (not shown) connected in pipe 24. Such gauge also assures the linear operation to be described hereinafter. Valve 20 is then closed and the pump either left connected or disconnected, as desired. It will be appreciated that the apparatus including valve 20 that I have just described for evacuating the system for proper operation thereof is only one preferable embodiment of many that can be employed for accomplishing these ends.

Figure 2:
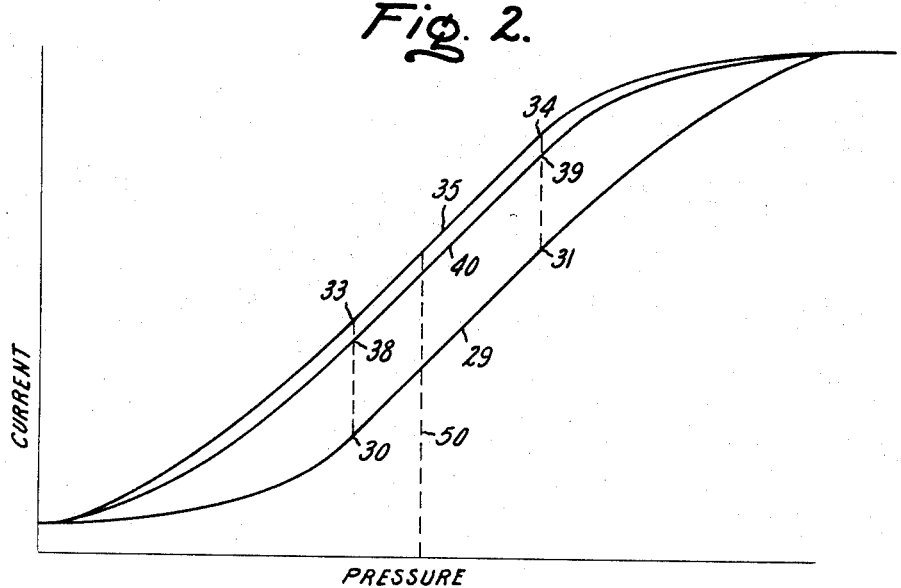
FIGURE 2 is a graphical illustration of the operational characteristics of the gas sensor of my invention.

In operation, the system, including ion pump 2 and tube 14, is evacuated in the manner aforementioned and a voltage, for example 4 kv., is impressed across leads 10 and 12, and thus across electrodes 4 and 6 of ion pump 2, to initiate the pumping action previously described. An ammeter 25 or other appropriate electrical measuring device is connected in an appropriate measuring circuit including electrodes 4 and 6, so that the electrical current flow through ion pump 2 is measured. With the ion pump functioning properly, tube 23 is brought into contact with the gas to be monitored and the current used by the ion pump is metered, as by the ammeter, aforementioned, until equilibrium conditions are reached. At equilibrium conditions the current used by ion pump 2 is constant and proportional to the gas pressure within tube 14. As the composition of the gas being monitored changes, the current used by the ion pump changes in proportion thereto to indicate the change in gas composition, as will be described. Restriction 17 is constructed to form opening 19 of size having a predetermined value, which is determined by the gas being monitored and the characteristics of ion pump 2 so that operation is always in the region where the relationship between gas pressure in ion pump 2, and the electrical current flowing through ion pump 2 is linear. The flow pressure product through orifice 19 is such that it is equal to the product of the pressure within ion pump 2 and the pumping speed of the pump. FIGURE 2 is illustrative of the operational characteristics of ion pump 2 for a variety of gases and indicates the linear region in which my sensor operates. This linear region of operation is a function of the gas pressure and is normally in the range of approximately $10^{-8}$ torr to $10^{-3}$ torr, the lower pressure dependent primarily on the pump geometry. Thus, it can be appreciated that the evacuation by the vacuum pump (not shown) connected to pipe 24 produces the above-mentioned pressure in the vicinity of $10^{-4}$ torr and thereby sets the system in the linear region of operation. A family of "S" curves are formed for the relationship between current and pressure in ion pump 2, one for each gas or group of gases employed. For example, if oxygen alone is being monitored, operation is along curve 29 but only in the linear region, between points 30 and 31 thereof, similarly for nitrogen the linear region is between points 33 and 34 of nitrogen curve 35 and for air operation is in the linear region between points 38 and 39 of air curve 40. Therefore, since operation is always in the linear region for every value of pressure in ion pump 2 there is only one value of current for any particular composition of gases. If operation were in the non-linear region there would be places where there are many values of pressure for each value of current, so that a meaningful reading is impossible. Because orifice 19 insures that operation is in the linear region at all times, sensing may be performed under any conditions of pressure within the linear current versus pressure range, including atmospheric pressure. Presently, ion pumps can only be employed in vacuum or near vacuum conditions (in the region of $10^{-4}$ torr) since any pressure above vacuum level will lead to operation in the nonlinear region of the operational characteristics and would produce meaningless readings. Also, if the pressure was significantly above vacuum levels, the chances of completely burning out the pump itself, because of the large electron flow between the electrodes would be very great.

With my sensor, because operation is always in the linear region, regardless of the gas or the pressure thereof employed, continuous use may be made of the sensor under any atmospheric conditions on the outside thereof. Therefore, for example, when oxygen is being monitored in air at atmospheric pressure, air first enters the sensor, to establish a reference level, and operation is on curve 40, along the linear region between points 38 and 39, at a specific value of pressure (as shown by dotted line 50). The pressure at which operation takes place is the pressure of the gas, which in this case would be air, in the atmosphere. As stated above, the initial pressure conditions within tube 14 are determined by a vacuum pump connected to pipe 24 and since such pumping obtains a pressure within tube 14 of between $10^{-3}$ and $10^{-8}$ torr, and the orifice is dimensioned for a flow pressure product therethrough which maintains pump operation in the linear current versus pressure range, there is no need to provide a gas pressure measuring device in tube 14. When the new surrounding gas, air containing additional oxygen, enters the sensor, operation is still along pressure line 50 in the linear region of a curve (not shown) for the particular air-oxygen mixture, that is between curves 29 and 40, the oxygen and air curves. Thus, it is seen that regardless of the gas being monitored, operation is always in the linear region of pump characteristics. Therefore, because of the linear relationship between the pressure within ion pump 2, as determined by the size of orifice 19, the current across electrodes 4 and 6, as shown along the vertical axis of FIGURE 2, is indicative of the relative amount of the gas being monitored in the atmosphere. It is noted that the change in current may be either an increase or decrease depending upon the specific gas being monitored, since the change is due to the ability of a gas to ionize, and may go down as with oxygen in air if the particular gas being monitored has a greater ability to form ions than the atmosphere. On the other hand, the current increases if the gas being monitored has less of an ability to form ions than the gas previously in the atmosphere surrounding the sensor, such as nitrogen in air, as in FIGURE 2. Thus, the change in current through ion pump 2, which may be indicated by an ammeter is immediately indicative of a change in the composition of the gas surrounding the detector. Therefore, regardless of the composition of the gases surrounding the detector, as long as a constant value of current can be achieved the sensor may be readily used for detecting another leak or another change in gas composition in rapid succession without any unnecessary delay time. Thus, it should be understood that my detector is in the nature of a GO—NO GO device wherein a change in the electrical current reading on ammeter 25 indicates: (1) a change in composition of two known gases at constant pressure, or (2) the pressure of a single gas has changed. Examples of the utility of my detector are as follows, for hospital use in an oxygen tent wherein the pressure is maintained constant, my device monitors the oxygen and detects whether any air enters to change the composition at constant pressure, or in a submarine for detecting changes in the pressure of the air environment within the submarine.

As a specific example of my sensor using the ion pump herein described as a leak detector wherein magnet 8 provides a magnetic field of 2,000 gauss and a voltage of 4 kv. is impressed across the electrodes of the pump, the ion pump has a capacity rating of 0.5 liter per second, the enclosed system volume including ion pump 2, tube 14 and pipe 18 is 160 cubic inches, and the system weight is 5 pounds. Orifice 19 provides a leak of a calibrated leakage rate (flow pressure product) of $1 \times 10^{-6}$ atmosphere cubic centimeters per second.

Alternatively, orifice 17 including tube 23 may be replaced by a permeable membrane placed across opening 13 in wall 15 so that all gas entering the sensor passes therethrough. The membrane is constructed so as to impart the same linear characteristics to pump 2 as orifice 19. The membrane also may have a selectivity as to certain specific gases, such as the permselective membranes described in U.S. Patent No. 3,256,675 entitled "Method and Apparatus for Gas Separation by Thin Films and Membranes"; U.S. Patent No. 3,274,750 entitled "Permeable Polymeric Membrane Gas Separation"; application Ser. No. 269,430 entitled "Process and Product" filed Apr. 1, 1963, now abandoned, and U.S. Patent No. 3,350,884 entitled "Process for the Separation or Enrichment of Gases," all by Walter L. Robb and assigned to the assignee of the present invention. Because of the selectively of these membranes, a specific gas may be monitored in a complex mixture of varying composition with relative ease.

It will also be appreciated that where there is only one gas in the atmosphere, the change in ionization value of the ion pump, as indicated by the change in current therethrough is, also indicative of a change in pressure within the pump. Thereby a change in pressure of the gas surrounding the sensor may be determined in the same manner, as aforementioned. Thus, my device readily operates as a pressure sensing device, as well as a concentration sensing device.

Alternatively, if desired, a third electrode may be employed with the ion pump, thus producing a conventional triode ion pump. In a triode pump, a third electrode is employed to bury or otherwise remove from the pumping action of the ion pump, gases which are relatively chemically inert such as argon or neon. Thus, a triode pump, a diode pump or any other ionic vacuum pump may be employed commensurate with my invention depending on the composition of the gases surrounding the sensor.

It is noted that a regular line voltage power supply, a battery or other voltage source may be employed for the potential drop across the electrodes of ion pump 2 with equivalent results.

It will be appreciated that my gas sensor may be employed in detecting a wide range of gases such as oxygen and various hydrocarbons by simply changing the size of restriction 17 so that its relationship to the ion pump for that particular gas is in accordance with the linear characteristics previously discussed. A relationship which readily permits detection of a gas presence under any pressure conditions.

It will be apparent from the foregoing that my invention attains the objectives set forth. Apparatus embodying the invention is sturdy in construction and well adapted for use in conjunction with various gases. Because of the ability to operate under any pressure conditions, my gas detector is readily employable in a multitude of applications in a highly efficient manner.

A specific embodiment of my invention has been illustrated but the invention is not limited thereto since many modifications may be made by one skilled in the art and the appended claims are intended to cover all such modifications as fall within the true spirit and scope of my invention.

What I claim as new and desire to secure by Letters Patent of the United States is:

1. A gas sensor for monitoring a gas comprising
an ion pump adapted to be connected to a source of voltage and having as operational characteristics, a gas pressure-to-electrical-current relationship which is linear over a region of pressure operation and having
an electron emitting element,
an electron collecting element,
magnetic means surrounding said emitting and collecting elements to produce a directional field between said elements which is in a different direction from that of an electrical field caused by the voltage source to thereby deflect the electrons traveling from the emitting element to the collecting element so that the length and time of travel between the emitting and collecting elements are substantially increased,
tubular means having a restriction forming an orifice therein in communication with said ion pump in an enclosed system capable of being evacuated, the orifice being the only opening through which gas may enter the ion pump and being related in size to said ion pump so that the flow pressure product through the orifice causes operation of said pump always in the linear region of its pressure-to-current operational characteristics, and thus since every gas including the gas being monitored produces a different pressure within the ion pump, a pressure which is due to collisions between the gas molecules and the electrons within the pump, the current response thereto, because of the linear characteristics, is always different and the gas being monitored is readily detected, and
means for supplying a voltage to electrodes of said pump, and
means for measuring the electrical current flowing in a circuit including the electrodes of the pump, the pressure range within which linear pump operation is obtained being $10^{-8}$ to $10^{-3}$ torr.

2. A gas sensor for detecting either a change in composition of several gases or a change in pressure of a single gas comprising
means for enclosing a low pressure gaseous atmosphere therein,
a gas ionizing pump positioned within said enclosing means, said pump having operating characteristics of electrical current versus gas pressure which are linear over a specific gas pressure range including that of the low pressure gaseous atmosphere,
means defining an orifice in said enclosing means for providing the sole passage into the interior of said enclosing means for a gas to be monitored, the orifice having a predetermined size such that the flow pressure product through the orifice maintains the pump operation in its linear operating range whereby a change in the electrical current used by the pump indicates either a change in composition of the gas being monitored, or a change in the pressure therein when the monitored gas comprises a gas of known composition, and means for supplying a voltage to electrodes of said pump, and means for measuring the electrical current flowing in a circuit including the electrodes of the pump, the pressure range within which linear pump operation is obtained being $10^{-8}$ to $10^{-3}$ torr.

References Cited

UNITED STATES PATENTS

| | | | |
|---|---|---|---|
| 2,796,555 | 6/1957 | Connor. | |
| 2,884,591 | 4/1959 | Snyder | 324—33 |
| 2,928,042 | 3/1960 | Lawrance et al. | 324—33 |
| 2,993,638 | 7/1961 | Hall et al. | |
| 2,996,661 | 8/1961 | Roberts | 324—33 |
| 3,051,868 | 8/1962 | Redhead | 324—33 X |
| 3,094,639 | 6/1963 | Jepsen. | |
| 3,233,169 | 2/1966 | Asamaki | 324—33 |

RUDOLPH V. ROLINEC, *Primary Examiner.*

C. F. ROBERTS, *Assistant Examiner.*